(12) United States Patent
Hu et al.

(10) Patent No.: US 10,746,605 B2
(45) Date of Patent: Aug. 18, 2020

(54) VISUAL EFFICACY MEASURING METHOD FOR OBJECTS IN DIFFERENT LIGHT ENVIRONMENTS

(71) Applicants: Beijing University Of Technology (CN), Beijing (CN); Guizhou Expressway Group Co., LTD. (CN), Guizhou (CN)

(72) Inventors: Jiangbi Hu, Beijing (CN); Xiaoyu Li, Beijing (CN); Xiaojuan Gao, Beijing (CN); Xiaoqin Zhang, Beijing (CN); Guiping Guan, Guizhou (CN); Jianmin Wang, Beijing (CN); Feng Liu, Beijing (CN); Linxi Gao, Beijing (CN); Yuanfeng Zhang, Beijing (CN); Jiamei Liu, Beijing (CN); Pengfei Xu, Beijing (CN); Jianlong Cheng, Beijing (CN); Jiechao Cheng, Beijing (CN); Ronghua Wang, Beijing (CN)

(73) Assignees: Beijing University of Technology (CN), Beijing (CN); Guizhou Expressway Group Co., Ltd (CN), Guizhou (CN)

( * ) Notice: Subject to any disclaimer, the term of this patent is extended or adjusted under 35 U.S.C. 154(b) by 135 days.

(21) Appl. No.: 15/580,363

(22) PCT Filed: Dec. 30, 2016

(86) PCT No.: PCT/CN2016/113400
§ 371 (c)(1),
(2) Date: Dec. 7, 2017

(87) PCT Pub. No.: WO2017/181726
PCT Pub. Date: Oct. 26, 2017

(65) Prior Publication Data
US 2019/0033140 A1    Jan. 31, 2019

(30) Foreign Application Priority Data

Apr. 20, 2016  (CN) .......................... 2016 1 0249223

(51) Int. Cl.
*G06K 9/00* (2006.01)
*G01J 5/60* (2006.01)
*G01M 11/00* (2006.01)

(52) U.S. Cl.
CPC ............... *G01J 5/60* (2013.01); *G01M 11/00* (2013.01)

(58) Field of Classification Search
CPC ........... G01J 5/60; G01M 11/00; G06F 30/00; G06K 9/00624; H05B 45/20; H05B 47/10
See application file for complete search history.

(56) References Cited

U.S. PATENT DOCUMENTS 8,100,552 B2    1/2012  Spero
2017/0337297 A1*  11/2017  Hu ....................... G01M 11/005

FOREIGN PATENT DOCUMENTS

CN    102764107 A    11/2012
CN    104296967 A     1/2015
(Continued)

OTHER PUBLICATIONS

Liu et al, Effects of LED Light Source Color Temperature on Tunnel Lighting in the Transition Zone, Jun. 2013, Light & Lighting, Chongqing Dazue, Jianzhu Chengui Xueyuan, CN, vol. 37, No. 2, pp. 34-37 (Year: 2013).*

(Continued)

*Primary Examiner* — Ping Y Hsieh
(74) *Attorney, Agent, or Firm* — Taft Stettinius & Hollister LLP; Stephen F. Rost

(57) ABSTRACT

The present invention relates to a visual efficacy measuring method for objects in different light environments, which (Continued)

comprises: (a) setting a light environment; (b) measuring a relationship between color temperature and time; (c) a driver visually recognizing a target object; (d) resetting the light environment, and repeating the step (c); (e) processing the visual recognition information data collected by the experiments so as to establish a relationship of the visual recognition time in relation with the light environmental parameters of color temperature, color rendering index and brightness; (f) performing visual efficacy analysis according to the processing results of the visual recognition information data. The present invention also provides a color temperature standard determining method for a tunnel middle section in day time, which comprises: (a) setting a light environment; (b) measuring a relationship between color temperature and time; (c) selecting a stably distributed color temperature segment; (d) determining the color temperature standard. The method of the present invention performs visual efficacy analysis of the influence that light environment settings of illumination on a night road or in a tunnel middle section have on drivers' visual recognition activity, thereby providing a good guiding standard for reasonable and efficient setting of color temperature, color rendering index and average brightness of an illumination device.

10 Claims, 7 Drawing Sheets

(56) References Cited

FOREIGN PATENT DOCUMENTS

| CN | 104316171 A | 1/2015 |
| CN | 105868570 A | 8/2016 |
| EP | 3203206 A1 | 8/2017 |

OTHER PUBLICATIONS

Yingying, et al., "Effects of LED Light Source Color Temperature on Tunnel Lighting in the Transition Zone", Light & Lighting, vol. 37 No. 2, Jun. 30, 2013, ISSN: 1008-5521, pp. 34-37. Abstract retrieved from <http://en.cnki.com.cn/Article_en/CJFDTotal-LAMP201302011.htm>.

Chinese Patent Office as ISA, "International Search Report" issued in Application No. PCT/CN/2016/113400, dated Apr. 5, 2017, 3 Pages.

Extended European Search Report, European Patent Office, dated Jun. 18, 2018, European Patent Application Ser. No. 16899305.3. pp. 1-13.

"Effects of LED Light Source Color Temperature on Tunnel Lighting in the Transition Zone", Liu et al., Deng Yu Zhaoming = Light & Lighting, Chongqing Daxue, Jianzhu Chenggui Xueyuan, CN, 37, No. 2, Jun. 30, 2013, pp. 34-37.

* cited by examiner

♦ lower than 6500K ▧ higher than 6500K

VISUAL EFFICACY MEASURING METHOD FOR OBJECTS IN DIFFERENT LIGHT ENVIRONMENTS

TECHNICAL FIELD

The present invention relates to the technical field of road tunnel illumination, and in particular relates to a visual efficacy measuring method for objects in different light environments and a color temperature standard determining method for a tunnel middle section in day time.

BACKGROUND

In order to improve the visual environment of a night road or a tunnel middle section so that light environments produced by artificial light sources can meet the requirements of driving safety, stability and comfort when a driver drives on the night road or in the tunnel middle section, it has been a problem not solved satisfactorily how to measure parameters that influences the light environments, including factors such as color temperature, color rendering index and brightness of an artificial light source, for providing a guiding standard of light environment settings to reach a safe and comfort level for visual recognition when driving on the road.

The methods for evaluating a light environmental parameter standard of a night road or a tunnel middle section, as disclosed domestically or abroad, lacks research on visual efficacy of a driver under different light source characteristics. Because a driver has different visual feelings and visually recognizes a target object differently in different light environments within different time segments, a comprehensive, objective and simple measuring method and system is needed for analyzing the visual efficacy of a driver under different light source characteristics so as to obtain a light environmental parameter standard that meets the visual recognition requirements of a driver in different light environments.

SUMMARY OF THE INVENTION

The purpose of the present invention is to overcome the above-mentioned technical defect of the prior art by providing a method for determining a light environmental parameter standard of a night road or a tunnel middle section that is reliable and convenient and meets the visual recognition requirements when driving, and meanwhile providing a visual efficacy measuring method for objects in different light environments of a night road or a tunnel middle section that is simple and reliable, with a high utilization rate, based on visual recognition safety, thereby overcoming the technical defect that the light environmental parameter standard of a night road or a tunnel middle section in the prior art is unreliable, complicated and without taking into account of physiological and psychological factors of the driver. By comprehensive analysis of parameters of color temperature, color rendering index and brightness level of the light environments, a light environmental parameter standard that meets the visual recognition requirements of a driver in different light environments is obtained.

In order to solve the above-mentioned problem of the prior art, a first aspect of the present invention provides a visual efficacy measuring method for objects in different light environments, comprising the following steps:

(a) setting light environmental parameters of an object environment, which comprise color temperature, color rendering index and brightness, selecting a set of color temperature, color rendering index and brightness as the light environmental parameters;

(b) measuring color temperature values of the object environment in different time segments to obtain a relationship between color temperature and time, and calculating an average color temperature value as the actually measured color temperature on the basis of color temperature values in the different time segments;

(c) determining the object environment in a night time segment to be a tunnel middle section according to color temperature values within the time segments in said relationship between color temperature and time, based on human body circadian rhythm, and performing a visual recognition test in the tunnel middle section, the visual recognition test comprising steps of:

(c1) placing a target object at a random target position in the tunnel middle section, wherein the target object has a surface reflection index of R and a side length of C;

(c2) assigning a tested driver to be at a driver position having a distance of D from the target position in the tunnel middle section, with a visual height of H, getting the tested driver to put on an eye movement recording device and calibrating the eye movement recording device, blocking the tested driver's observation direction with a shelter;

(c3) recording an eye movement video with the calibrated eye movement recording device, removing the shelter, and instructing the tested driver to search and visually recognize the target object;

(c4) operating the eye movement recording device to stop recording the eye movement video, and archiving the visual recognition results and the eye movement video of the tested driver;

(c5) changing the tested driver, and repeating the steps (c1) to (c4), thereby obtaining the visual recognition results and the eye movement video of multiple tested drivers;

(d) resetting the light environmental parameters by using different color temperature, color rendering index and brightness for the tunnel middle section, and repeating the steps (b) and (c) to obtain the visual recognition results and the eye movement video of multiple tested drivers under multiple different sets of light environmental parameters;

(e) analyzing the visual recognition results and the eye movement video of the multiple tested drivers collected by the eye movement recording device, determining the visual fixation frames of the multiple tested drivers visually recognizing the target object as well as the validity of the visual recognition results, calculating the visual recognition time for the multiple tested drivers to visually recognize the target object in different light environments according to the visual fixation frames, performing correlation analysis on the visual recognition information data to establish a relationship of the visual recognition time in relation with the actually measured color temperature, color rendering index and average brightness of the light environments, thereby obtaining data relation curves of corresponding visual recognition time and color rendering index under different actually measured color temperatures with the same brightness;

(f) performing visual efficacy analysis by analyzing the relationship of the human body circadian rhythm and the visual recognition time in relation with the actually measured color temperature, color rendering index and brightness of the light environments, thereby obtaining a standard of light environmental parameters for improving visual efficacy of the target object with a combination of color temperature, color rendering index and brightness.

A second aspect of the present invention provides a color temperature standard determining method for a tunnel middle section in day time, comprising:
(a) setting light environmental parameters of an object environment, which comprise color temperature, color rendering index and brightness, selecting a set of color temperature, color rendering index and brightness as the light environmental parameters;
(b) measuring color temperature values in different time segments to obtain a relationship between color temperature and time,
(c) selecting a stably distributed color temperature segment according to the relationship between color temperature and time,
(d) determining color temperature to be a major factor that influences driving safety in day time environment according to a relationship of light source in relation with melatonin secretion inhibition of human body circadian rhythm, and based on analysis of how human eyes adapt to color temperature of light, setting the stably distributed color temperature segment to be the color temperature standard for the tunnel middle section in day time, wherein said object environment is natural light environment in day time.

The method of the present invention improves the accuracy of safety evaluation of light environments of a night road or a tunnel middle section, by combining and screening the information of visual recognition reaction and visual recognition effect towards a small target object when a driver drives in a tunnel middle section under the generated different light environments, according to human body circadian rhythm, analyzing how a driver adapt to the color temperature of the light environments, so as to comprehensively propose a set of light environment guiding standards for safe visual recognition on a night road or in a tunnel middle section that is based on human body circadian rhythm and meets the safe visual recognition requirements for a driver, which considers the human body circadian rhythm of a driver in different time segments and takes into account of the required visual recognition characteristics for a driver, and in the meantime, the method uses simple operations to provide a reference basis for light environment study for road traffic safety.

BRIEF DESCRIPTION OF THE DRAWINGS

Referring to the appended drawings, more purposes, functions and advantages of the present invention are illustrated by the description below of the embodiments of the present invention, wherein.

Figure 1:
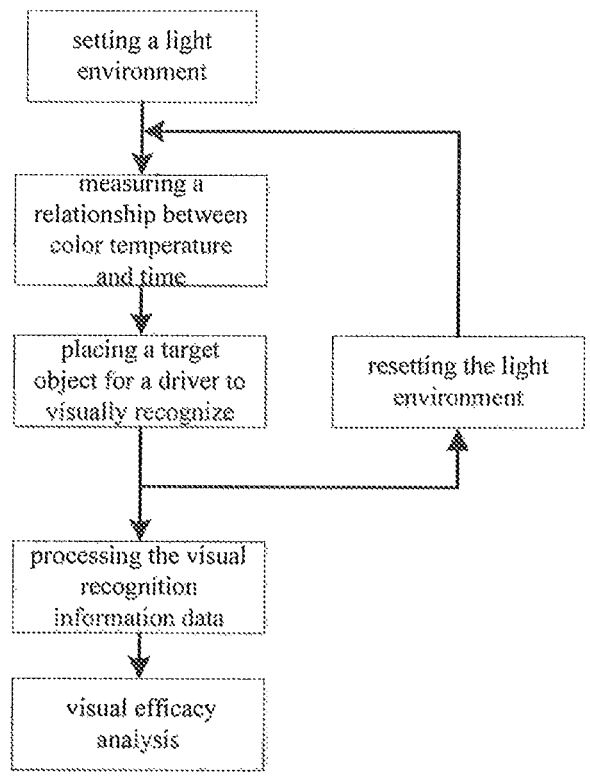
FIG. 1 is a flow chart of the visual efficacy measuring method for objects in different light environments in a tunnel middle section.

REFERENCE SIGNS 100 tunnel middle section
101 simulated tunnel middle section
102 illumination device
103 target object
104 tested driver
105 shelter

DETAILED DESCRIPTION OF EMBODIMENTS

Because the night road environment is similar to a tunnel middle section environment, the tests of the present invention is carried out in a tunnel middle section, and the test results can equally be applied to night road illumination settings.

Embodiment 1

Figure 3:
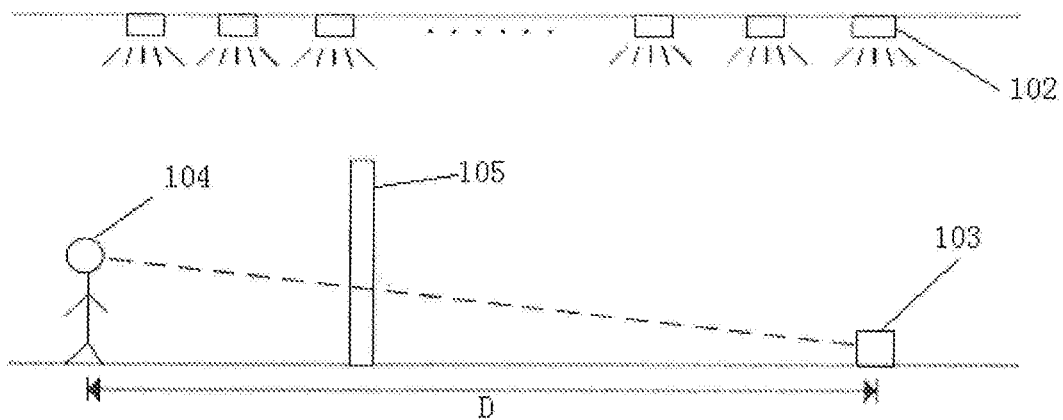
FIG. 3 is a schematic diagram of the test in the visual efficacy measuring method for objects in different light environments.
Figure 4:
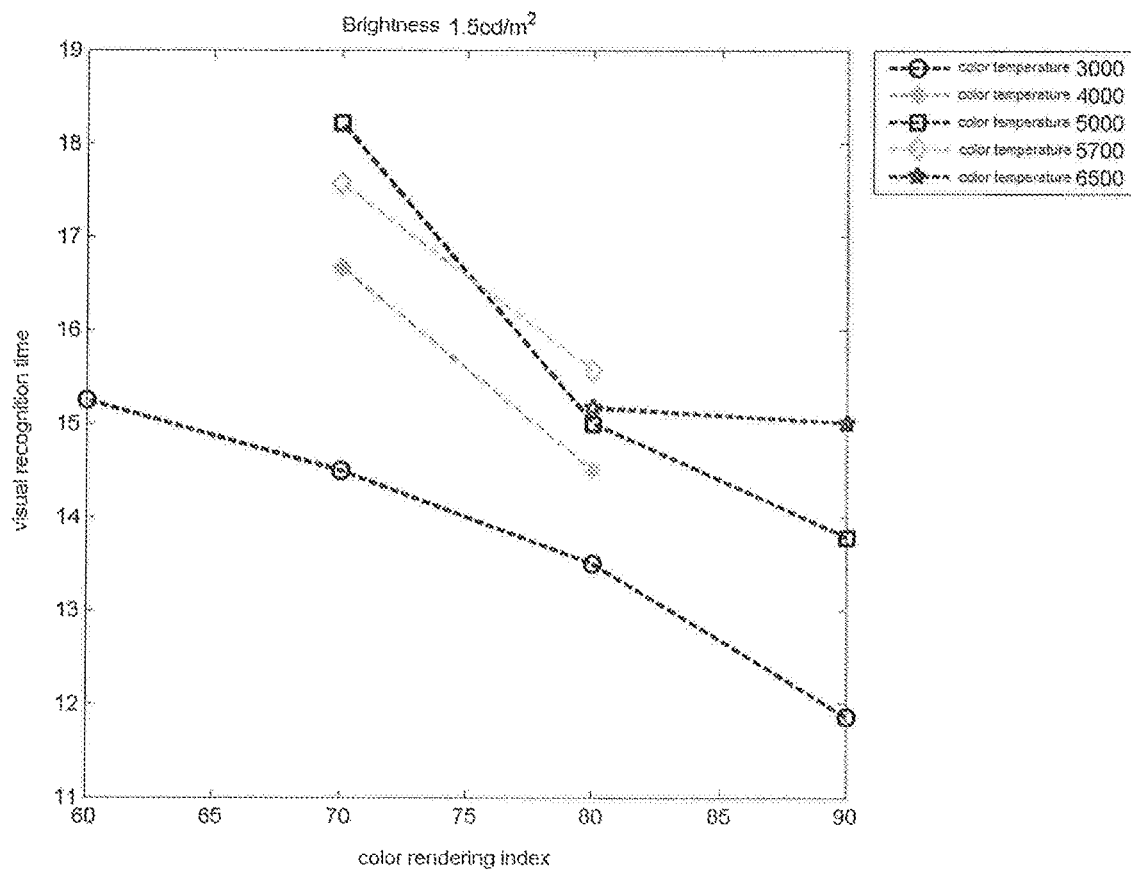
FIG. 4 is a relation curve of data of color rendering index and visual recognition time under different color temperatures with a brightness of 1.5 cd/m$^2$.
Figure 5:
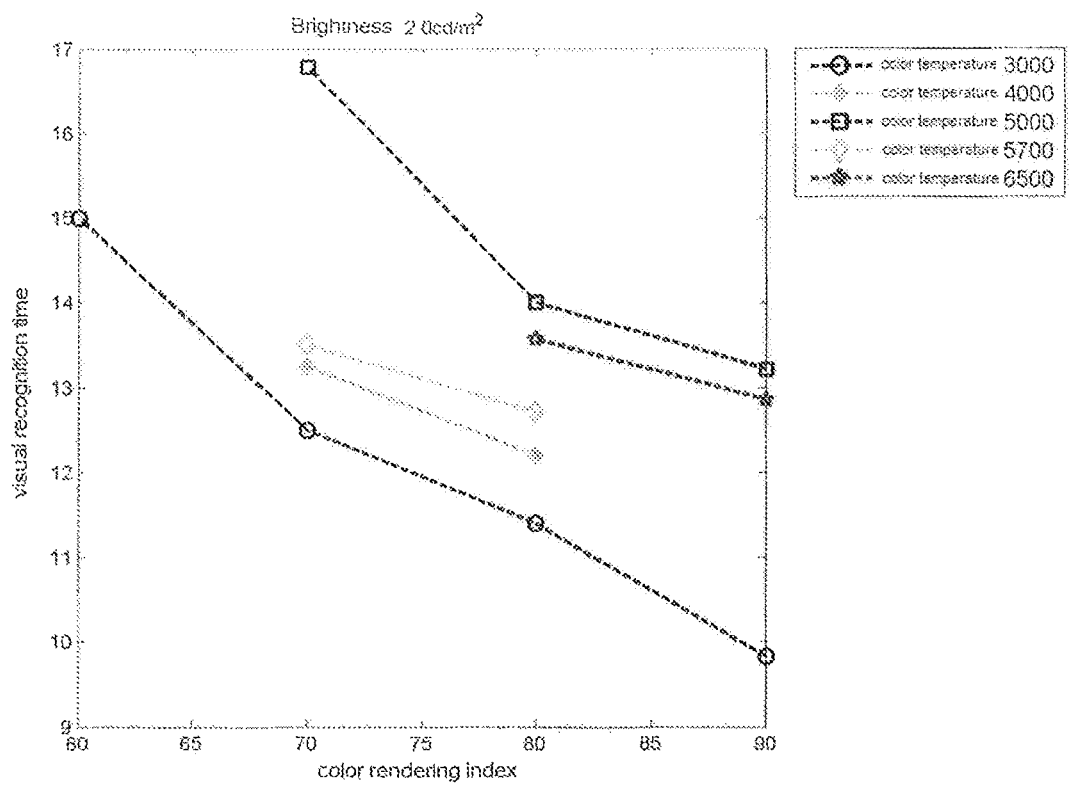
FIG. 5 is a relation curve of data of color rendering index and visual recognition time under different color temperatures with a brightness of 2.0 cd/m$^2$.
Figure 6:
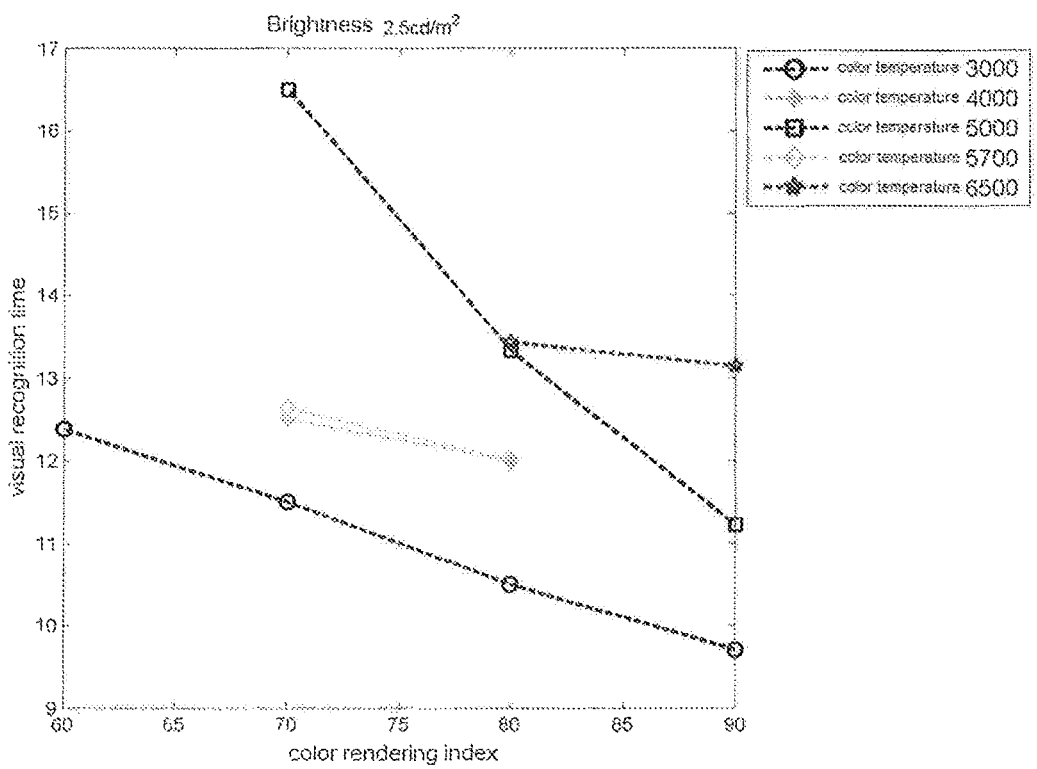
FIG. 6 is a relation curve of data of color rendering index and visual recognition time under different color temperatures with a brightness of 2.5 cd/m$^2$.
Figure 7:
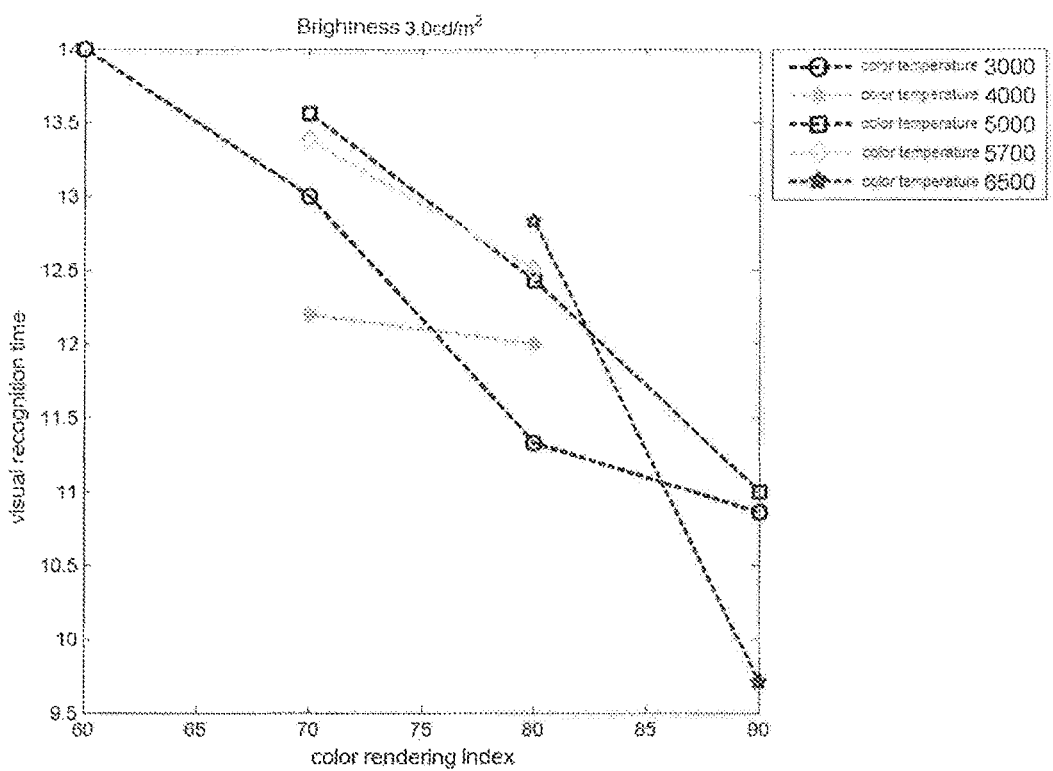
FIG. 7 is a relation curve of data of color rendering index and visual recognition time under different color temperatures with a brightness of 3.0 cd/m$^2$.
Figure 8:
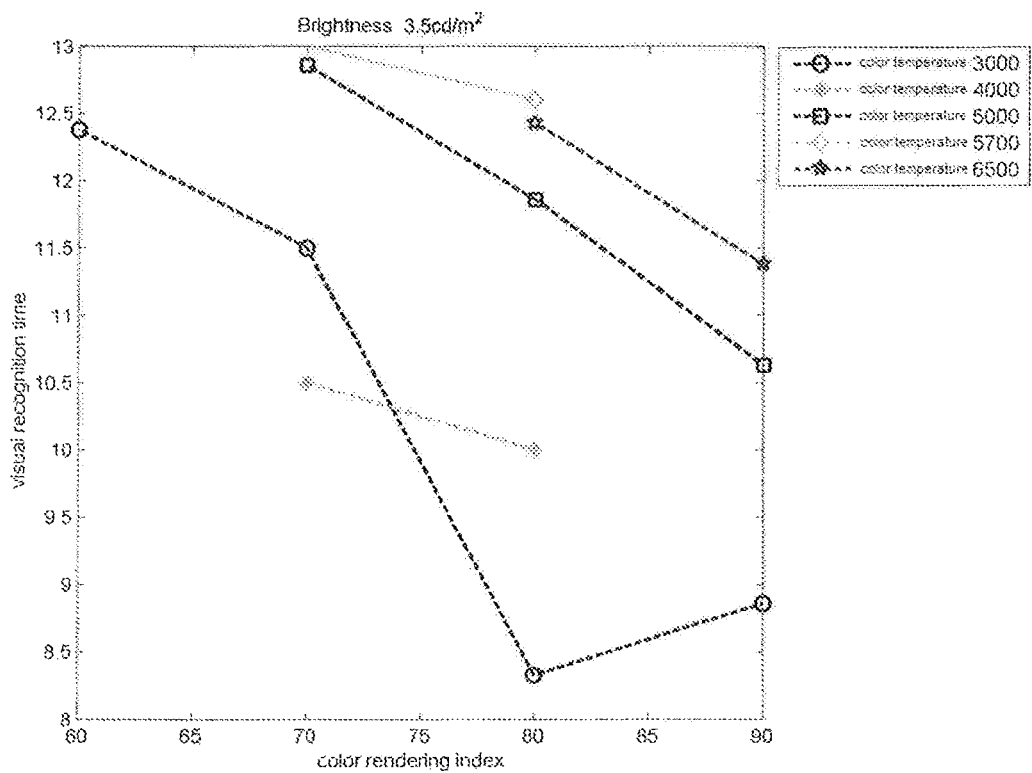
FIG. 8 is a relation curve of data of color rendering index and visual recognition time under different color temperatures with a brightness of 3.5 cd/m$^2$.
Figure 9:
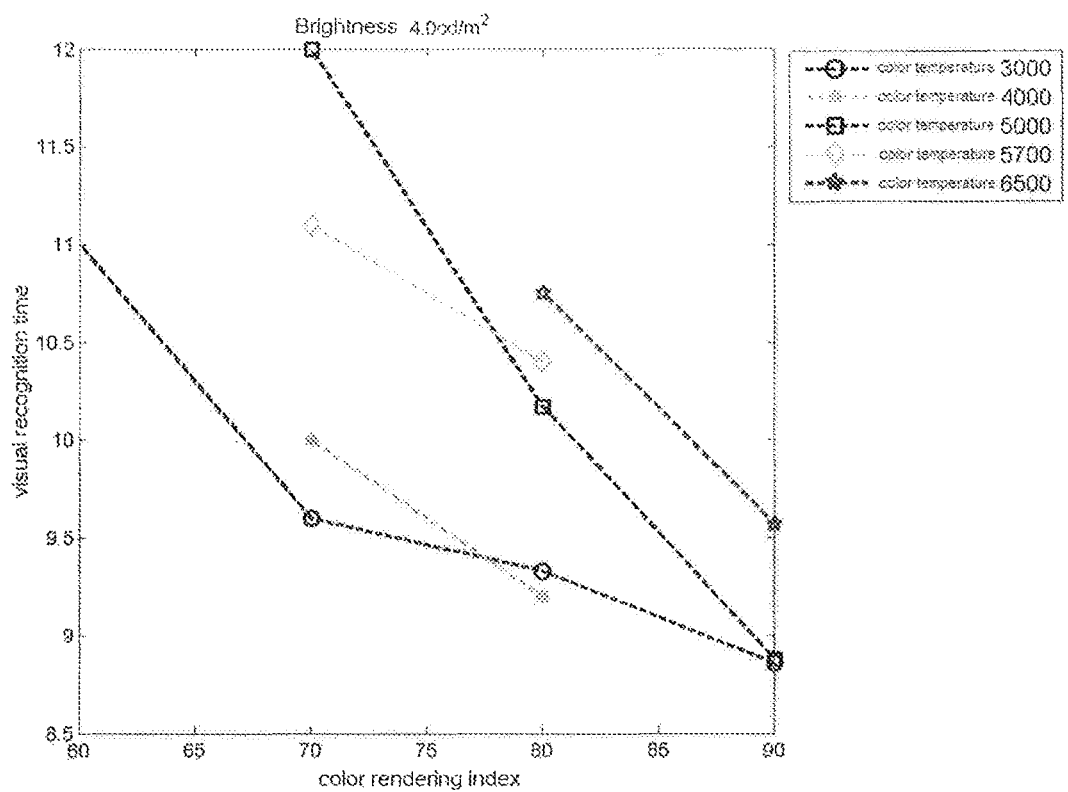
FIG. 9 is a relation curve of data of color rendering index and visual recognition time under different color temperatures with a brightness of 4.0 cd/m$^2$.
Figure 10:
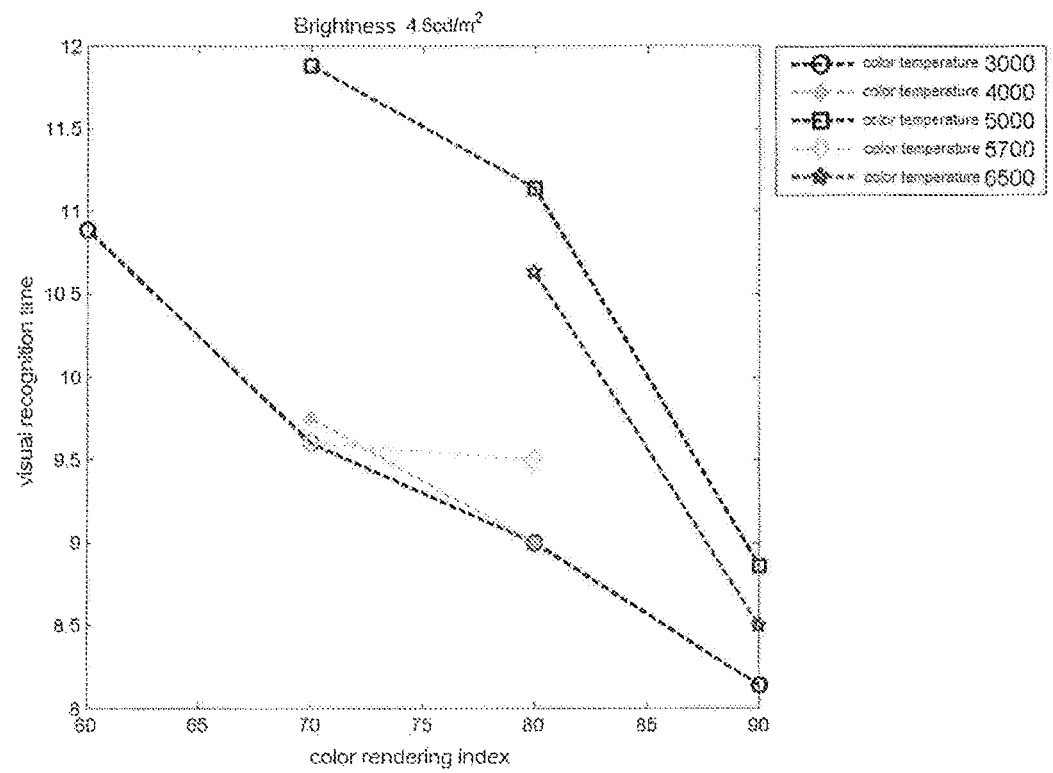
FIG. 10 is a relation curve of data of color rendering index and visual recognition time under different color temperatures with a brightness of 4.5 cd/m$^2$.
Figure 11:
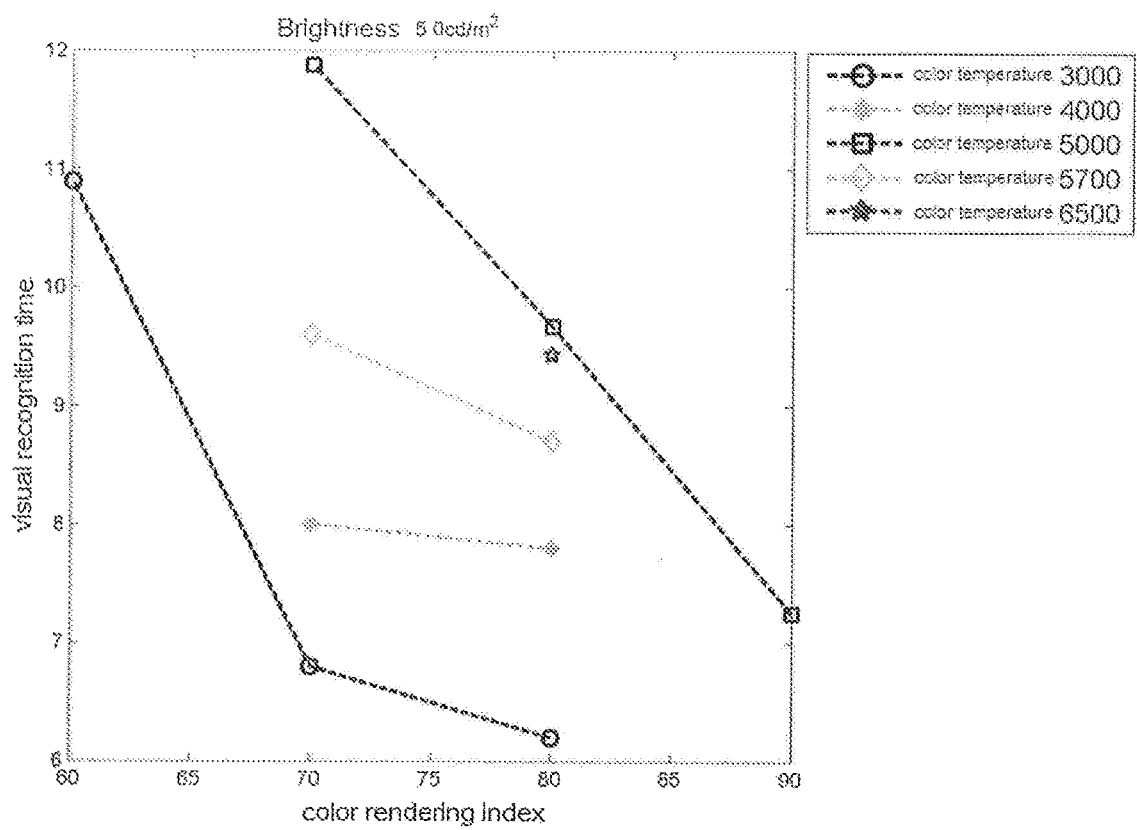
FIG. 11 is a relation curve of data of color rendering index and visual recognition time under different color temperatures with a brightness of 5.0 cd/m$^2$.

FIG. 1 shows a flow chart of the visual efficacy measuring method for objects in different light environments in a tunnel middle section according to the present invention, FIG. 3 shows a schematic diagram of the test for carrying out the visual efficacy measuring method for objects in different light environments provided by the present invention. By using the visual efficacy measuring method for objects in different light environments provided by the present invention, influencing factors for visual efficacy towards objects in different light environments are measured, so as to ensure the light environment configured according to the test results can meet the visual recognition safety requirements for a driver.

Referring to FIG. 1 and FIG. 3, the measuring method for objects in different light environments according to the present invention comprises the following steps:

Step (a): setting light environmental parameters of an object environment, which comprise color temperature, color rendering index and brightness. In a measurement test, different color temperature, different color rendering index and different average brightness can be configured, so as to select a set of color temperature, color rendering index and brightness as the light environmental parameters for setting a light environment. Because the parameters of a light source in an object environment can represent the light environmental parameters of the object environment to some extent, the aforementioned set of color temperature, color rendering index and brightness as the light environmental parameters can be provided by setting the parameters of the light source. In order to directly get the light environmental parameters of the object environment, after the initial setting, the actual parameters of color temperature, color rendering index and brightness of the object environment can be measured by a measuring device. For brightness, in order to truly represent the condition of the object environment, brightness values at multiple points in the object environment may be measured, and then an average value is calculated to be the brightness value of the object environment.

Step (b): measuring color temperature values of the object environment in different time segments to obtain a relationship between color temperature and time, for analyzing the variation of color temperature with time, and calculating an average color temperature value as the actually measured color temperature on the basis of color temperature values in the different time segments. The color temperature measured in this way sufficiently takes into account of the influence that different time segments have on the variation of color temperature, so as to more truly represent the light environmental condition of the object environment. The aforementioned color temperature values in different time segments are color temperature values in a continuous time duration, the specific time length should take into consideration of the test time after every time of setting the light environment, and sampling can be done with fixed time interval or discretely, with the sampling time recorded as the time values in the relationship between color temperature and time, and real time continuous sampling may also be done, with an average value calculated by using a statistic function, and with the middle value of the sampling time duration recorded as the time values.

Step (c): determining the object environment in a night time segment to be a tunnel middle section according to time point values in said relationship between color temperature and time, based on human body circadian rhythm, and performing a visual recognition test in the tunnel middle section. The time point values are described according to local time of the time zone where the object environment is, for example, a 24-hour time system may be used to describe the time point values by 0 to 24 hours, when a time point value is in the range of 0 to 6 hours or 20 to 24 hours, it is determined that the time point is in a night time segment; for another example, a 12-hour time system may also be used to describe the time point values by 0 to 12 hours a.m. and 0 to 12 hours p.m., when a time point value is in the range of 0 to 6 hours a.m. or 8-12 hours p.m., it is determined that the time point is in a night time segment; of course, other time systems may be used, and conversion thereof may be done according to international conversion standards. The visual recognition test comprises: (c1) placing a target object at a random target position in the tunnel middle section, wherein the target object has a surface reflection index of R and a side length of C; (c2) assigning a tested driver to be at a driver position having a distance of D from the target position in the tunnel middle section, with a visual height of H, getting the tested driver to put on an eye movement recording device and calibrating the eye movement recording device, blocking the tested driver's observation direction with a shelter; (c3) recording an eye movement video with the calibrated eye movement recording device, removing the shelter, and instructing the tested driver to search and visually recognize the target object; (c4) operating the eye movement recording device to stop recording the eye movement video, and archiving the visual recognition results and the eye movement video of the tested driver; (c5) changing the tested driver, and repeating the steps (c1) to (c4), thereby obtaining the visual recognition results and the eye movement video of multiple tested drivers.

It is found by researches that, in long time evolution of humans, the surrounding light environment affects human body circadian rhythm, including night-and-day rhythm, hormone secretion and alert level. The light sensing cells of human eyes transmit light signal to the hypothalamus pathway and then into the hypothalamus nuclei such as the optic nerve crossing upper nucleus and the hypothalamus paraventricular nucleus, so the optic nerve crossing upper nucleus transmits the light signal to the respective control centers in the nerve system, thereby adjusting secretion of almost all of the hormones, such as cortisol, melatonin, insulin and oxytocin, wherein, the secretion of melatonin would lower the attentiveness of human body. In a driving environment, too much secretion of melatonin by human body would adversely affect the driving safety, therefore, when evaluating whether a light environment in a tunnel middle section is a safe driving environment, the factor of human body circadian rhythm is taken into account, by considering the effect that a light environment has on the secretion of melatonin, so as to determine the influence that the human body circadian rhythm gas on safe visual recognition. It is found out by analyzing the human body circadian rhythm that, between 6:00 a.m. and 8 p.m., the melatonin secretion nearly stops; and between 8 p.m. and 6:00 a.m. of the next day, the melatonin secretion is started and human body response is slowed down. Therefore, in a night tunnel, for ensuring the driving safety, visual recognition tests are carried out to measure the visual recognition results of a driver visually recognizing a target object in the light environment of a tunnel middle section at night, which directly represents the human body response. The test method comprises placing a target object in the tunnel middle section, wherein the target object may be selected as a cubic object with a side length of C, choosing multiple drivers to be tested at a tested driver position, with a distance of D from the position of the target object to the position of the tested driver in the tunnel middle section, and with a visual height of H for the tested driver; getting the tested driver to put on an eye movement recording device and calibrating the eye movement recording device so as to start recording an eye movement video, blocking the tested driver's front view with a shelter; randomly placing the visual recognition target object and then removing the shelter, in the meantime instructing the tested driver to search and visually recognize the target object; after the visual recognition is finished, stopping the recording of the eye movement video, and archiving the visual recognition results and related test information of the tested driver.

In an actual tunnel test, the distance D from the position of the visual recognition target object to the starting point of the tunnel middle section is usually no less than the safe stopping sight distance Do corresponding to a maximum speed limit designed for the tunnel.

Step (d): resetting the light environmental parameters by using different color temperature, color rendering index and brightness for the tunnel middle section, and repeating the Steps (b) and (c) to obtain the visual recognition results and the eye movement video of multiple tested drivers under multiple different sets of light environmental parameters.

Step (e): analyzing the visual recognition results and the eye movement video of the multiple tested drivers collected by the eye movement recording device, determining the visual fixation frames of the multiple tested drivers visually recognizing the target object as well as the validity of the visual recognition results, calculating the visual recognition time for the multiple tested drivers to visually recognize the target object in different light environments according to the visual fixation frames, performing correlation analysis on the visual recognition information data to establish a relationship of the visual recognition time in relation with the actually measured color temperature, color rendering index and average brightness of the light environments, thereby obtaining data relation curves of corresponding visual recognition time and color rendering index under different actually measured color temperatures with the same brightness.

Step (f): performing visual efficacy analysis by analyzing the relationship of the human body circadian rhythm and the visual recognition time in relation with the actually measured color temperature, color rendering index and brightness of the light environments, thereby obtaining a standard of light environmental parameters for improving visual efficacy of the target object with a combination of color temperature, color rendering index and brightness.

Color temperature of a light source is the temperature of a "black body" that has the same color of light radiation as the light source, measured in units of Kelvin (K). Light sources with different color temperatures have different colors of light radiation, which causes different visual feelings. The energy of light is inversely proportional to the wavelength. When the energy of light increases, the percentage of short wavelength light in the light spectrum increases, and the percentage of long wavelength light decreases, so the color of the light gradually turns blue. Light with a color temperature of larger than 5300K is called cold light, and light with a color temperature of less than 3300K is called warm light. If the color temperature of a light source is selected properly, it can balance the central nervous system and autonomic nervous system of human, thereby relaxing nervousness; otherwise, it might cause dysfunction of the central nervous system and even disturbs the natural balance of human body. Light with different color temperatures has different penetrating ability in air due to different power distribution in the light spectrum, which affects the visual recognition of a driver. As shown in Table 1 below, light environments with different color temperatures have different physiological and psychological influences on a driver. In illumination environments having different color temperatures of the light source, a driver has different visual recognition responses and effects towards a target object, therefore, the color temperature value in a light environment of a night road or a tunnel middle section has significant influence on the driving safety. By analyzing data relation curves of corresponding visual recognition time and color rendering index under different actually measured color temperatures with the same brightness, a relationship between the visual recognition time which represents the driving safety level and the color temperature is obtained, so as to determine a guiding standard of light environmental parameter settings with an improved visual efficacy towards a target object, thereby ensuring the driving safety for the driver.

TABLE 1

Human comfort levels corresponding to different color temperatures and luminance

| luminance | related color temperature (K) | | |
|---|---|---|---|
| | <3300 | 3300-5300 | >5300 |
| <500 | comfortable | neutral | cold |
| 500-1000 | ↑ | ↑ | ↑ |
| 1000-2000 | dazzling | comfortable | neutral |
| 2000-3000 | ↑ | ↑ | ↑ |
| >3000 | unnatural | dazzling | comfortable |

In a night environment, it is dark outside the tunnel, with very weak light of natural light source and a brightness of nearly zero. When a driver drives into the tunnel at night, his/her pupil would shrink rapidly, the larger difference of luminance and light color between inside and outside of the tunnel, the faster that the pupil area would shrink. Under such circumstances, the light environment inside the tunnel is significantly superior than outside the tunnel, and in a very short time period, the driver enters a bright light environment produced by artificial light source of the tunnel from a dark natural environment, and then reenters the dark natural environment, so that the driver would undergo an bright adaption process when entering the tunnel and then undergo a dark adaption process when reentering the dark environment outside the tunnel. If the light environment of the tunnel middle section is selected to have too high a color temperature, the light color appears white, with too much difference of light color between inside and outside of the tunnel, it would cause a dazzling feeling for the driver, with undesirable glare phenomenon; if the light source is selected to have too low a color temperature, the light color appears yellow, it would cause visual fatigue for the driver driving in a long tunnel middle section, with a sleepy feeling. Therefore, if the light environment in the tunnel is unsatisfactorily selected, it would cause psychological discomfort for the driver. A light environment which is comfortable and awakening should be selected for the tunnel middle section.

In order to improve the reliability of the guiding standard of light environmental parameter settings, the color of the target object is selected to be uncolored. Being uncolored means being white, gray or black with no color, a white, gray or black uncolored object has equal light absorption towards the various wavelengths in a white light spectrum, such an object with a reflection ratio of 80-90% or more is white, such an object with a reflection ratio of 4% or less is black, and such an object with a reflection ratio between 4% and 80-90% is gray to a certain extent, i.e., gray is somewhat between black and white.

Studies on spectral components of natural light indicate that the color temperature distribution similar to natural light is in a range of 5000K to 6000K. Thus, in order to improve the validity and universality of measured data, in the tests of this embodiment, the color temperature can be selected in an extended range according to the above-mentioned value range, for example, the value range of color temperature can be set between 3000K-6500K; from the perspective of visual recognition safety and comfort as well as operating cost reduction, the value range of color rendering index can be set between 50-100. The illumination environment brightness level is one important parameter for evaluating the illumination quality of a tunnel.

Some international academic groups and countries in the world have different provisions on brightness indicators adopted for illumination of a tunnel middle section. The Table 2 below is the basic illumination brightness table for a tunnel middle section provided by China's "Design Rules of Ventilation and Illumination for Road Tunnels" (JTG/T D70/2-01-2014) currently in effect:

TABLE 2

Basic illumination brightness table for a tunnel middle section $L_{in}(cd/m^2)$

| | | $L_{in}$ One-way traffic | | |
|---|---|---|---|---|
| | | N ≥ 1200 veh/(h · ln) | 350 veh/(h · ln) < N < 1200 veh/(h · ln) | N ≤ 350 veh/(h · ln) |
| Design | | | Two-way traffic | |
| speed $v_t$(km/h) | | N ≥ 650 veh/(h · ln) | 180 veh/(h · ln) < N < 650 veh/(h · ln) | N ≤ 180 veh/(h · ln) |
| 120 | | 10.0 | 6.0 | 4.5 |
| 100 | | 6.5 | 4.5 | 3.0 |
| 80 | | 3.5 | 2.5 | 1.5 |
| 60 | | 2.0 | 1.5 | 1.0 |
| 20–40 | | 1.0 | 1.0 | 1.0 |

In order to improve the validity and the universality of measured data, the brightness level in this embodiment is set in a value range of 1.0 cd/m² to 5.0 cd/m².

In order to make the visual efficacy measuring method for objects in different light environments of the present invention more reliable and conform with international standards, in this embodiment, for the illumination standard determining method for a tunnel middle section 100 based on safe visual recognition, the target object 103 is a gray cubic object of about 20 cm×20 cm×20 cm, with a reflectance of 20%. In order to eliminate the influence that the driver's memory about the target object position has on the experimental results, the position of the target object in the tunnel middle section 100 is set randomly in the tests, and in the setting process of the target object, an obstruction (such as a black curtain) is arranged to block between the tested driver and the target object.

In this embodiment, the setting of the light environment is carried out by using an adjustable illumination device, an uncolored object, a spectroscopic radiation measurement device, a brightness measurement device, a dynamic eye movement measurement device and a distance measurement device for testing, so that this embodiment is conveniently implemented. In order to make the measurement results better conform to objective reality, in the visual efficacy measuring method for uncolored objects in different light environments of the present invention, multiple drivers are randomly selected from persons in different age segments, with different normal eyesight levels and different driving ages.

According to the method of this embodiment, the relationship analysis between the driver's visual recognition time and the parameters of color temperature, color rendering index, brightness of the light environment is established. Through experiments as well as analysis and processing of experimental data, a guiding standard of light environmental parameter settings, which effectively and reasonably meets the objective visual efficacy requirements of drivers, is obtained for actual night road illumination and tunnel middle section illumination.

Embodiment 2

As measuring experiments in an actual environment can hardly be completed due to the influence of passing-by vehicles if tests are conducted in a tunnel middle section in actual use, in this embodiment, it is more practical to carry out the measurement tests of the present invention by using a simulated tunnel middle section.

In this embodiment, the inventor builds an experimental environment with length, width and height of 60×3.8×3.8 m in a long corridor of a warehouse. In order to make the light source of the experimental environment controllable and free from the influence of reflection light from materials on top and side surfaces, the top surface, the left side surface and the right side surface of the experimental environment are covered with black cloth, and the ground is paved with modified asphalt waterproofing membranes which are diffuse reflection series materials similar to an asphalt concrete pavement.

In order to make the illumination light source controllable and convenient to operate, multiple light sources are selected for experiments, such as LED light sources which are commonly used in tunnels currently. Studies on spectral components of natural light indicate that the color temperature distribution similar to natural light is in a range of 5000K to 6000K. Thus, in order to improve the validity and universality of measured data, the representative light sources of this experiment are selected to have five color temperature levels of 3000K, 4000K, 5000K, 5700K and 6500K. From the perspective of visual recognition safety and comfort as well as operating cost reduction, four color rendering index levels of 60, 70, 80 and 90 are selected in this experiment. An experimental scheme is designed for these five color temperature levels and four color rendering index levels, such that fourteen different light sources are designed in total, as shown in Table 3 below.

TABLE 3

Color Temperature vs. Color Rendering Index Table of the Light Source

| | Color Temperature (K) | | | | |
|---|---|---|---|---|---|
| Color Rendering Index | 3000 | 4000 | 5000 | 5700 | 6500 |
| 60 | ✓ | — | — | — | — |
| 70 | ✓ | ✓ | ✓ | ✓ | — |
| 80 | ✓ | ✓ | ✓ | ✓ | ✓ |
| 90 | ✓ | — | ✓ | ✓ | ✓ |

The illumination environment brightness level is one important parameter for evaluating the illumination quality of a tunnel. The design speed selected by this experiment is 80 km/h, and the safe visual recognition distance is 110 m. According to the tunnel illumination design requirements (see Table 2), brightness values in the tunnel middle section are mostly 1.5 cd/m² to 3.5 cd/m². Therefore, in order to improve the validity and universality of the measured data, eight brightness levels of 1.5 cd/m², 2.0 cd/m², 2.5 cd/m², 3.0 cd/m², 3.5 cd/m², 4.0 cd/m², 4.5 cd/m² and 5.0 cd/m² are selected in this embodiment for measurement.

This experiment involves human cognition. In order to avoid the influence that drivers with different genders, ages and personal characters have on the experimental results, 10 males averagely aged between 26 and 50 years old and 2 females averagely aged between 26 and 50 years old are selected for this experiment, as shown in Table 3 below. According to the experimental purpose, 12 healthy drivers with no history of cardiovascular diseases, heart diseases and other major diseases are selected to be tested, and the tested drivers are required to have a binocular uncorrected visual acuity of over 4.9 and have no color blindness, color weakness or other eye diseases. The drivers are required to have good rest and response normally during the experiment. The drivers are required to be free of unfavorable conditions such as alcohol consumption and medication during the experiment.

TABLE 4

Profiles of Tested Drivers

|  | Sex | | | | | | |
|---|---|---|---|---|---|---|---|
|  | Male | | | | | Female | |
|  | Age | | | | | | |
|  | 26-30 | 31-35 | 36-40 | 41-45 | 46-50 | About 34 | About 42 |
| Number | 2 | 2 | 2 | 2 | 2 | 1 | 1 |

In the experiment, the tested driver's visual height is the "eye height" H, referring to the height from the driver's eyes to the ground. In China's corresponding standards, the eye height is defined according to a minibus with a low vehicle body, and the standard eye height $H_0$ is 1.2 m.

In tunnel illumination, the contrast degree of an object is a substantial factor for the human eye to recognize the obstruction object. The contrast between brightness of the object and brightness of the background constitutes the contrast degree of the object. If the brightness of the object is close to the brightness of the background, visibility will be low no matter how high the brightness of the road surface is maintained, which will bring a risk to the driving safety and thus is unfavorable. With a high contrast degree, the object is easy to be recognized by human eyes. As gray objects have a low contrast degree when compared with asphalt concrete pavements that are often used in tunnels, a gray cubic object is used as the visual recognition object according to the principle of most unfavourable condition.

As obstruction objects on a road are mostly composed of irregular polyhedrons, the minimum height of a vehicle chassis to the ground changes in a range of 0.10 m to 0.20 m. The critical height of an obstruction object on the road that would cause a vehicle to overturn is 18 cm, so drivers must take dodging measures when the height of the obstruction object is larger than 18 cm. The visual recognition object selected in this embodiment is a gray cubic object having a size of 20 cm×20 cm×20 cm and a surface reflection coefficient of 0.2, as recommended by the Commission Internationale de L'Eclairage (CIE) as a reference for evaluating a driver's safe visual recognition. Actual traffic obstruction objects may vary in color or size, but research has shown that objects according to this standard will be suitable for evaluation of various different illumination environments. Therefore, in this embodiment, the above-mentioned gray cubic object of 20 cm×20 cm×20 cm is used, with a standard side length $C_0$ of 20 cm, as a standard visual recognition object for evaluating visibility factors of tunnel illumination.

In this embodiment, the selected tunnel has a maximum speed limit of 80 km/h and a safe stopping sight distance Do of 110 m, and as the experimental site has an actual effective distance D of 45 m and cannot provide an enough observation distance, according to the principle of retinal imaging, the size of the object and the tested driver's eye height for visual recognition are proportionally reduced in a particular experiment to obtain the driver's actual eye height and the size of the object, as shown in Table 5.

TABLE 5

Conversion Table of Object Size and Eye Height for Visual Recognition

|  | Visual recognition distance | Size of Object (cm) | Eye Height for Visual Recognition |
|---|---|---|---|
| 80 km/h Stopping Sight Distance | 110 m | 20 cm × 20 cm × 20 cm | 1.2 m |
| Size after Conversion | 45 m | 8.2 cm × 8.2 cm × 8.2 cm | 0.49 m |

As shown in Table 5, when the visual recognition distance D in the simulated tunnel middle section is 45 m, the driver's visual height is 0.49 m, and the size of the visual recognition target object is 8.2 cm×8.2 cm×8.2 cm. During the test, the driver takes a posture of half sit lying on the ground to conduct the test.

Figure 2:
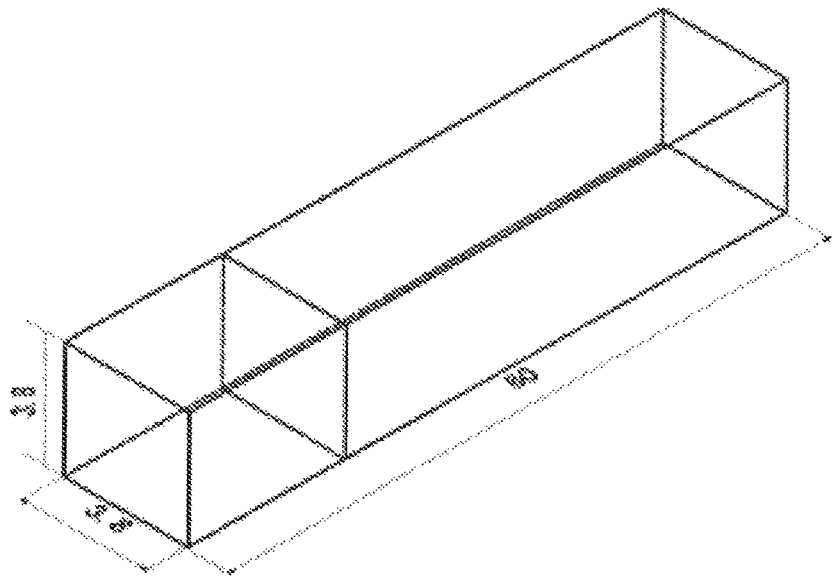
FIG. 2 is a schematic diagram of a simulated tunnel middle section.

In the simulated tunnel middle section as shown in FIG. 2, the light environment of the simulated tunnel middle section is set to be very similar to that of an actual tunnel middle section, by the above-mentioned settings of the light environment and the test environment for the simulated tunnel middle section.

In order to carry out the test in the simulated tunnel middle section under different light environmental parameters, illumination devices with various light source characteristics can be mounted in the simulated tunnel middle section; for example, one from more than ten different illumination light sources can be selected and mounted according to experimental requirements. Parameter values of the color temperature, color rendering index and average brightness of the provided light environment are measured by a color temperature measurement device, a color rendering index measurement device and a brightness measurement device, for example, a spectroscopic radiation illuminometer and a color luminance meter are used for measuring parameters of color rendering index, brightness, chrominance, and relevant color temperature. By calibrating the illumination device to produce a uniform light environment, the light environmental parameter values required by the experiment is reached. The positions of the driver and the target object are determined, the driver's eye height is adjusted to 0.49 m, the color temperature and color rendering index at the position of the object are measured by using the illuminometer (according to actual experimental conditions), and the brightness at the position of the object is measured by using the luminance meter; the tested driver is asked to put on an ETG eye tracker, and after the ETG eye tracker is calibrated (by a five point calibration method), video recording is started; the working staff blocks the driver's front scene with a black curtain, places the target object, and then removes the black curtain, meanwhile the tested driver begins to visually recognize the target object, and video recording is stopped after the visual recognition is finished, and then the driver is asked to answer the following questions: (1) whether there seems to be a target object; (2) the shape of the target object; and (3) the color of the target object, so that a visual recognition result is obtained; the visual recognition result is compared with the actual shape and color of the target object, and if a visual recognition result does not match the actual shape and color of the target object, it is determined that the visual recognition result is an invalid result. Then, the aforementioned experiment process is repeated, until all drivers finish their visual recognition tests; after that, the next set of light source is mounted, so that the light environmental parameters are reset, and then the aforementioned experimental processes are repeated, until the designed 14 light sources have all been tested.

In order to increase the sample quantity to improve the accuracy and validity of the measured data, experiments are repeated with different drivers in the same experimental environment, so as to eliminate the drivers' individual differences. The total sample quantity of the experiment is 1308.

In this embodiment, the selected dynamic eye tracker has a data acquisition frequency of 30 Hz, i.e. the eye movement data is acquired every 20 ms; the eye movement capturing range is ±35° in the horizontal direction and ±27.5° in the vertical direction; eye movement tracking resolution is 0.1°; accuracy of vision focus is 0.5° to 1.0° (at all distances). The information such as the driver's visual fixation points can be dynamically recorded during visual recognition. Through the information about the driver's visual recognition towards the target object as acquired by the eye tracker, the frames of the driver's visual fixation points when the driver visually captures the target object can be analyzed and determined so as to get a visual recognition time by conversion.

Digital cameras, digital video cameras and other equipment are also used in the experiment to shoot necessary scenes during the experiment, so as to provide necessary information support for later data analysis.

By analyzing the video information acquired by the eye tracker, the frames of the visual fixation points (visual recognition time) for the driver to visually capture the target object can be obtained and used to determine the visual recognition time for the driver to visually recognize the target object under different light environmental characteristic conditions. Through statistics and collection of the experiment data, and by using MATLAB software for processing, data relation curves of corresponding visual recognition time and color rendering index under different actually measured color temperatures with the same brightness are obtained, as shown in FIG. 4 to FIG. 11, which show relation curves of visual recognition time and color rendering index at average brightness levels of 1.5 cd/m$^2$, 2.0 cd/m$^2$, 2.5 cd/m$^2$, 3.0 cd/m$^2$, 3.5 cd/m$^2$, 4.0 cd/m$^2$, 4.5 cd/m$^2$, 5.0 cd/m$^2$.

As seen from the relation curves shown in FIG. 4 to FIG. 11, in the variation trends of the data relation curves in this embodiment, when the color temperature of the light source is 3000K, 4000K, 5000K, 5700K or 6500K, as the color temperature increases when the light color changes from yellow to white, the visual recognition time for the driver to visually recognize the target object also increases. The visual recognition time lengths for the driver to visually recognize the target object under illumination of the two light sources of lower color temperatures of 3000K and 4000K are relatively short, with a good visual efficacy. Therefore, with a certain average brightness level, the yellow light sources with lower color temperatures of 3000K or 4000K have increased light color contrast degree between the target object and background environment, when compared to white light sources with higher color temperatures, so as to increase the visual acuity of the driver visually recognizing the target object and thus increase the visual efficacy for visual recognition when driving, which is beneficial for the driver to visually recognize the target object. Hence, a light source with lower color temperature should be selected for the tunnel middle section at night, so that the driver feels comfortable and the visual recognition efficiency is improved. As a conclusion of the study of visual efficacy for recognizing a target object under different light source characteristic conditions, the blue light in the radiation spectrum of an illumination light source would stimulate the pupil of human eyes to shrink, so as to cause a better visual efficacy, and in consideration of this conclusion, a little blue light is added into the spectrum of the light source in the tunnel middle section at night, so as to increase the visual acuity. Therefore, the value range of the color temperature is selected to be 3500K-3700K, which is both visually comfortable and awakening for the driver.

Embodiment 3

Figure 12:
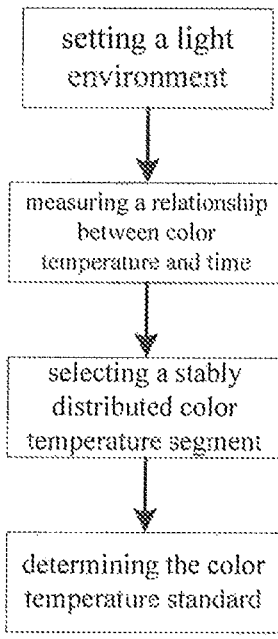
FIG. 12 is a schematic diagram of the color temperature standard determining method for a tunnel middle section in day time.

The present invention also provides a color temperature standard determining method for a tunnel middle section in day time, as shown in FIG. 12, this method comprises the following steps:

(a) setting light environmental parameters of an object environment, which comprise color temperature, color rendering index and brightness, selecting a set of color temperature, color rendering index and brightness as the light environmental parameters. The setting process can simulate the object environment by artificially adjusting the parameters of a light source. In order to make the determining method more reliable, the light environmental parameters may be set randomly. Of course, the measurement device can be directly put in a random object environment.

(b) measuring color temperature values of the object environment in different time segments by using a color temperature measurement device such as a spectroscopic radiation illuminometer, so as to obtain a relationship between color temperature and time. During the measurement, color temperature values in different time segments may be continuously measured. In the experiment, the light environmental parameters of the object environment are set randomly, and the representative random object environment may be a natural light environment in day time of a random day which could be a cloudy day or a sunny day. The measurement is done continuously or on different dates, and the corresponding time points are recorded, so that a statistic table is finally formed, which represents a relationship between color temperature and time points of natural light environment in day time. Table 6 and Table 7 show the color temperature values of natural light in day time of a sunny day or a cloudy day.

TABLE 6

Color temperature values of natural light in day time of a sunny day

| time | color temperature (K) |
|---|---|
| 7:25 | 6110.8 |
| 7:35 | 6105.1 |
| 7:40 | 6076.2 |
| 7:45 | 6255.9 |
| 7:50 | 5991 |
| 7:54 | 5317.1 |
| 7:57 | 5083.7 |
| 8:00 | 4963.6 |
| 8:03 | 5350.2 |
| 8:06 | 5089.4 |
| 8:09 | 4464.9 |
| 8:12 | 4716.1 |
| 8:15 | 4777.5 |
| 8:18 | 4570.4 |
| 8:21 | 4433.7 |
| 8:24 | 4434.6 |

TABLE 6-continued

Color temperature values of natural light in day time of a sunny day

| time | color temperature (K) |
|---|---|
| 8:27 | 4903.1 |
| 8:30 | 4635 |
| 8:33 | 4431.7 |
| 8:36 | 4424.5 |
| 8:39 | 4791.8 |
| 8:42 | 4601 |
| 8:45 | 4642.7 |
| 8:48 | 4622 |
| 8:51 | 4661.9 |
| 8:54 | 4672.6 |
| 8:57 | 4703.2 |
| 9:00 | 4715.7 |
| 9:02 | 4557 |
| 9:03 | 4715.8 |
| 9:06 | 4703.1 |
| 9:09 | 4738.5 |
| 9:12 | 4754.6 |
| 9:15 | 4750.2 |
| 9:18 | 4759.3 |
| 9:21 | 4760.7 |
| 9:24 | 4770 |
| 9:26 | 4521 |
| 9:27 | 4733 |
| 9:30 | 4749.8 |
| 9:33 | 4730.7 |
| 9:36 | 4751.9 |
| 9:39 | 4746.2 |
| 9:42 | 4745.9 |
| 9:45 | 4749.5 |
| 9:48 | 4751.7 |
| 9:51 | 4704.3 |
| 9:54 | 4707.7 |
| 10:00 | 4790.7 |
| 10:03 | 4772.4 |
| 10:06 | 4795 |
| 9:51 | 4704.3 |
| 9:54 | 4707.7 |
| 10:00 | 4790.7 |
| 10:03 | 4772.4 |
| 10:06 | 4795 |
| 10:09 | 4767 |
| 10:12 | 4720.1 |
| 10:13 | 4693 |
| 10:16 | 4716 |
| 10:17 | 4684 |
| 10:18 | 4710 |
| 10:18 | 5007.6 |
| 10:19 | 4702 |
| 10:21 | 4690.2 |
| 10:27 | 4702 |
| 10:30 | 4708.5 |
| 10:33 | 4772.8 |
| 10:34 | 4640 |
| 10:35 | 4640 |
| 10:36 | 4652 |
| 10:36 | 4872.4 |
| 10:37 | 4638 |
| 10:37 | 4630 |
| 10:38 | 4647 |
| 10:38 | 4665 |
| 10:39 | 4649 |
| 10:39 | 4662 |
| 10:39 | 4700.1 |
| 10:45 | 4825.8 |
| 10:48 | 4784.1 |
| 10:51 | 4762.3 |
| 10:54 | 4725.1 |
| 10:55 | 4750 |
| 10:56 | 4742 |
| 10:57 | 4759 |
| 10:57 | 4737.6 |
| 10:58 | 4742 |
| 10:58 | 4732 |
| 11:00 | 5081.2 |
| 11:03 | 4795.4 |
| 11:06 | 5280.9 |
| 11:09 | 4862.5 |
| 11:14 | 4759 |
| 11:15 | 4785 |
| 11:16 | 4801 |
| 11:17 | 4796 |
| 11:18 | 4799 |
| 11:19 | 4798 |
| 11:20 | 4798 |
| 11:21 | 4796 |
| 11:22 | 4785 |
| 11:23 | 4791 |
| 11:30 | 4843 |
| 11:31 | 4843 |
| 11:32 | 4837 |
| 11:33 | 4834 |
| 11:34 | 4830 |
| 11:35 | 4819 |
| 11:36 | 4810 |
| 11:37 | 4816 |
| 11:38 | 4809 |
| 11:39 | 4834 |
| 11:49 | 5245.6 |
| 13:13 | 5302.7 |
| 13:17 | 5453.4 |
| 13:23 | 5846.4 |
| 13:45 | 5390 |
| 13:58 | 4847 |
| 14:09 | 5363.7 |
| 14:21 | 5901 |
| 14:57 | 6007.9 |
| 15:02 | 5590.1 |
| 15:34 | 4794 |
| 15:35 | 4780 |
| 15:35 | 4910.5 |
| 15:36 | 4768 |
| 15:37 | 4767 |
| 15:38 | 4767 |
| 15:39 | 4760 |
| 15:40 | 4770 |
| 15:40 | 4848.8 |
| 15:41 | 4771 |
| 15:42 | 4782 |
| 15:43 | 4785 |
| 15:43 | 4856 |
| 15:55 | 4849.7 |
| 16:05 | 5442.8 |
| 16:08 | 5206.5 |
| 16:13 | 4734.9 |
| 16:17 | 4787.3 |
| 16:21 | 4861.2 |
| 16:26 | 4800.5 |
| 16:31 | 4885.2 |
| 16:36 | 5547.6 |
| 16:40 | 4681.3 |
| 16:44 | 4849.8 |
| 16:48 | 5406.6 |
| 16:53 | 5658.9 |
| 16:58 | 4979.9 |
| 17:03 | 4518 |
| 17:08 | 4513.6 |
| 17:13 | 4480.5 |
| 17:17 | 4499.9 |
| 17:23 | 4961 |
| 17:23 | 4468.1 |

TABLE 7

Color temperature values of natural light in day time of a cloudy day

| time | color temperature (K) |
|---|---|
| 9:06 | 6366 |
| 9:14 | 6313 |
| 9:35 | 6301 |
| 9:39 | 6298 |
| 9:41 | 6301 |
| 9:43 | 6291 |
| 9:47 | 6277 |
| 9:50 | 6291 |
| 9:52 | 6291 |
| 9:55 | 6275 |
| 9:59 | 6239 |
| 10:01 | 6257 |
| 10:07 | 6244 |
| 10:10 | 6240 |
| 10:13 | 6237 |
| 10:16 | 6235 |
| 10:19 | 6243 |
| 10:22 | 6246 |
| 10:25 | 6250 |
| 10:28 | 6226 |
| 10:31 | 6230 |
| 10:34 | 6232 |
| 10:37 | 6193 |
| 10:40 | 6190 |
| 10:43 | 6227 |
| 10:46 | 6205 |
| 10:49 | 6190 |
| 10:51 | 6186 |
| 10:54 | 6170 |
| 10:56 | 6164 |
| 10:58 | 6169 |
| 11:00 | 6165 |
| 11:02 | 6178 |
| 11:04 | 6182 |
| 11:06 | 6155 |
| 11:08 | 6162 |
| 11:10 | 6169 |
| 11:12 | 6159 |
| 11:14 | 6142 |
| 11:16 | 6155 |
| 11:19 | 6151 |
| 11:21 | 6145 |
| 11:23 | 6141 |
| 11:25 | 6147 |
| 11:27 | 6154 |
| 11:29 | 6164 |
| 11:31 | 6174 |
| 11:33 | 6167 |
| 11:35 | 6176 |
| 11:37 | 6166 |
| 11:41 | 6163 |
| 11:43 | 6159 |
| 11:45 | 6164 |
| 11:47 | 6146 |
| 11:49 | 6154 |
| 11:52 | 6147 |
| 11:54 | 6139 |
| 11:56 | 6138 |
| 11:58 | 6125 |
| 12:00 | 6116 |
| 12:02 | 6105 |
| 12:04 | 6105 |
| 12:08 | 6141 |
| 12:10 | 6147 |
| 12:12 | 6160 |
| 12:14 | 6156 |
| 12:16 | 6152 |
| 12:18 | 6144 |
| 12:20 | 6138 |
| 12:22 | 6138 |
| 12:24 | 6142 |
| 12:26 | 6152 |
| 12:28 | 6144 |
| 12:30 | 6159 |

TABLE 7-continued

Color temperature values of natural light in day time of a cloudy day

| time | color temperature (K) |
|---|---|
| 12:32 | 6146 |
| 12:34 | 6146 |
| 12:36 | 6153 |
| 12:38 | 6146 |
| 12:40 | 6147 |
| 12:42 | 6149 |
| 12:45 | 6152 |
| 12:48 | 6149 |
| 12:50 | 6143 |
| 12:53 | 6139 |
| 12:55 | 6142 |
| 12:57 | 6141 |
| 13:00 | 6135 |
| 13:02 | 6141 |
| 13:04 | 6143 |
| 13:07 | 6145 |
| 13:09 | 6160 |
| 13:11 | 6151 |
| 13:13 | 6153 |
| 13:15 | 6149 |
| 13:17 | 6143 |
| 13:19 | 6146 |
| 13:21 | 6158 |
| 13:23 | 6149 |
| 13:25 | 6159 |
| 13:27 | 6167 |
| 13:29 | 6156 |
| 13:32 | 6158 |
| 13:34 | 6168 |
| 13:36 | 6158 |
| 13:38 | 6166 |
| 13:40 | 6176 |
| 13:46 | 6166 |
| 13:48 | 6164 |
| 13:50 | 6166 |
| 13:52 | 6172 |
| 13:54 | 6175 |
| 13:56 | 6180 |
| 13:58 | 6187 |
| 14:00 | 6188 |
| 14:02 | 6192 |
| 14:04 | 6202 |
| 14:06 | 6202 |
| 14:08 | 6196 |
| 14:10 | 6196 |
| 14:12 | 6181 |
| 14:14 | 6195 |
| 14:16 | 6185 |
| 14:18 | 6187 |
| 14:20 | 6188 |
| 14:24 | 6207 |
| 14:26 | 6208 |
| 14:28 | 6201 |
| 14:30 | 6208 |
| 14:33 | 6226 |
| 14:35 | 6201 |
| 14:37 | 6186 |
| 14:39 | 6223 |
| 14:41 | 6229 |
| 14:43 | 6228 |
| 14:45 | 6228 |
| 14:47 | 6229 |
| 14:49 | 6223 |
| 14:51 | 6202 |
| 14:53 | 6159 |
| 14:55 | 6163 |
| 14:57 | 6195 |
| 15:00 | 6242 |
| 15:02 | 6222 |
| 15:04 | 6219 |
| 15:06 | 6236 |
| 15:09 | 6234 |
| 15:10 | 6237 |
| 15:13 | 6206 |

TABLE 7-continued

Color temperature values of natural light in day time of a cloudy day

| time | color temperature (K) |
|---|---|
| 15:15 | 6190 |
| 15:17 | 6224 |
| 15:19 | 6214 |
| 15:21 | 6220 |
| 15:45 | 6240 |
| 15:47 | 6231 |
| 15:50 | 6251 |
| 15:52 | 6252 |
| 15:56 | 6255 |
| 15:58 | 6240 |
| 16:07 | 6291 |
| 16:09 | 6302 |
| 16:11 | 6302 |
| 16:13 | 6291 |
| 16:16 | 6328 |
| 16:18 | 6345 |
| 16:20 | 6327 |
| 16:22 | 6338 |
| 16:24 | 6324 |
| 16:27 | 6324 |
| 16:29 | 6354 |
| 16:31 | 6360 |
| 16:33 | 6354 |
| 16:35 | 6365 |
| 16:37 | 6384 |
| 17:08 | 6500 |
| 17:10 | 6545 |
| 17:12 | 6540 |
| 17:14 | 6512 |
| 17:16 | 6605 |
| 17:18 | 6498 |
| 17:20 | 6779 |
| 17:44 | 7217 |
| 17:46 | 7186 |
| 17:49 | 7200 |
| 17:52 | 7600 |
| 17:54 | 7843 |
| 17:56 | 7817 |
| 17:58 | 7882 |
| 18:00 | 8001 |

Figure 13:
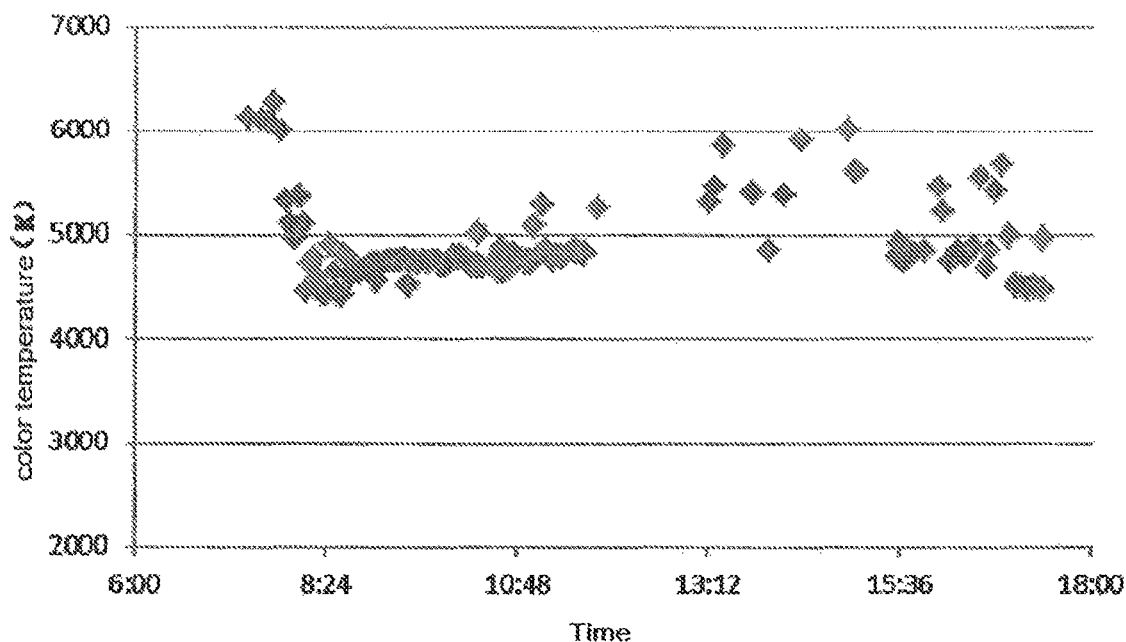
FIG. 13 is a distribution diagram of color temperature of natural light in day time of a sunny day.
Figure 14:
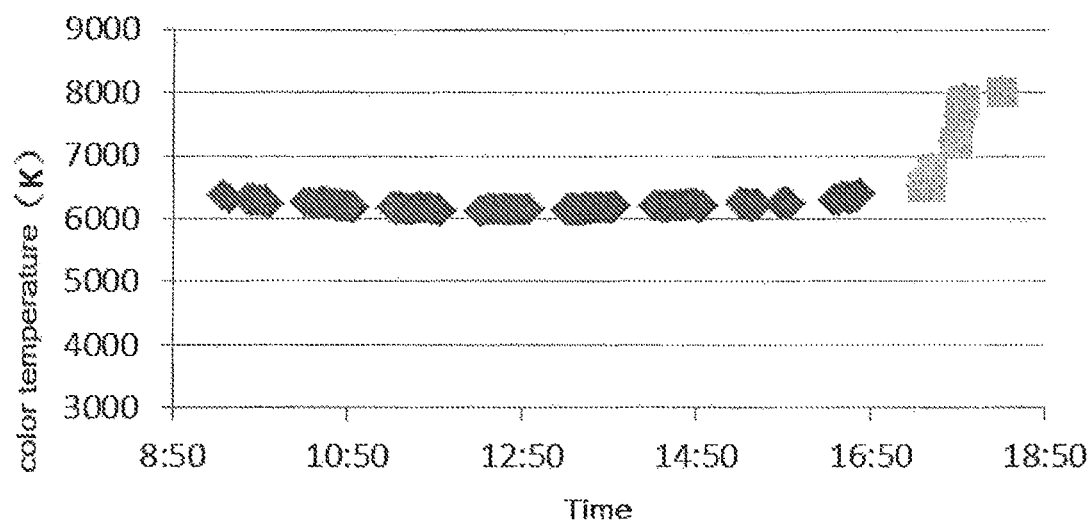
FIG. 14 is a distribution diagram of color temperature of natural light in day time of a cloudy day.

(c) establishing distribution diagrams according to the above listed relationship between color temperature and time, so as to determine a stably distributed color temperature segment. FIG. 13 shows a distribution diagram of color temperature in day time of a sunny day, as seen from the diagram, in a sunny day, the color temperature is relatively high before 8:00 and decreases with time, and the color temperature basically remains stably distributed in a range of 4500-5000K during 8:00-17:00. FIG. 14 shows a distribution diagram of color temperature in day time of a cloudy day, as seen from the diagram, in a cloudy day, the color temperature remains stable in a range of 6000-7000K for the entire day time.

(d) determining color temperature to be a major factor that influences driving safety in day time environment according to the relationship of light source in relation with melatonin secretion inhibition of human body circadian rhythm, and based on analysis of how human eyes adapt to color temperature of light, setting the stably distributed color temperature segment to be the color temperature standard for the tunnel middle section in day time, wherein said object environment is natural light environment in day time It is found by researches that, there are intrinsically photosensitive Retinal Ganglion Cells (ipRGCs) on a retina of a mammal, these ipRGCs transmit light signal to the hypothalamus pathway (RHT) and then into the hypothalamus nuclei such as the optic nerve crossing upper nucleus (SCN) and the hypothalamus paraventricular nucleus (PVN), so the optic nerve crossing upper nucleus transmits the light signal to the respective control centers in the nerve system, thereby adjusting secretion of almost all of the hormones, such as cortisol, melatonin, insulin and oxytocin. In day time, the secretion of melatonin is inhibited to keep a person conscious. Too much secretion of melatonin would cause a person to be sleepy and thus adversely affect the driving safety. The ipRGCs have different sensitivity towards light with different wavelengths, thereby causing different amounts of melatonin to be secreted. The color temperature value of a light environment represents the different wavelengths of light spectral components in day time environment, so that the color temperature is a major factor that influences driving safety in day time environment.

The analysis of how human eyes adapt to color temperature is as follows: the light environment of a tunnel middle section is a relatively stable light environment when compared with that of a tunnel entrance or exit section, if the light environment of the tunnel middle section is selected to have too high a color temperature, the light color appears white, with too much difference of light color between inside and outside of the tunnel, it would cause a dazzling feeling for the driver, with undesirable glare phenomenon; if the light source is selected to have too low a color temperature, the light color appears yellow, it would cause visual fatigue for the driver driving in a long tunnel middle section, with a sleepy feeling. Human eyes have higher visual acuity under a natural light source than under an artificial light source, the visual sense has long time evolution under natural light, so humans have got used to the light color of a natural light source, therefore, human eyes are more sensitive to the light color of natural light for inhibition of melatonin secretion. By setting the tunnel middle section to have a light color environment close to that of an external natural light source, the influence upon the visual sense of a driver due to color temperature difference of light sources when a driver drives into and out of a tunnel can be alleviated, so that the visual recognition efficiency of the driver is increased under the same brightness level and the safety and comfort of driving is improved. The brightness of a safe light environment may be reduced under the same visual recognition efficiency, so as to save resource and energy. The above-mentioned step of setting the stably distributed color temperature segment to be the color temperature standard for the tunnel middle section in day time comprises, but not limited to, directly using the stably distributed color temperature segment as the standard, wherein actual factors should also be taken into account, such as the factor of energy saving.

With the light color of the light source in the tunnel middle section in day time selected to be close to that of external natural light, the driver feels comfortable, and the purposes of increasing the visual recognition efficiency, improving the safety and comfort level of driving, and saving resource consumption can be achieved. Because a light source with higher color temperature consumes more energy and tends to cause a dazzling effect, the color temperature of the light environment in the tunnel middle section determined by the aforementioned determining method is preferably in a range of 4500-5000K.

Embodiment 4

The present invention also provides a system for carrying out the visual efficacy measuring method for objects in different light environments and the color temperature standard determining method for a tunnel middle section in day time. The system comprises: a simulated tunnel middle section subsystem, comprising an adjustable illumination device mounted in the tunnel middle section, wherein light absorbing materials are provided on the top surface, the left side surface and the right side surface of the simulated tunnel, an obstruction object for blocking visions are arranged in the simulated tunnel, and diffuse reflection materials similar to an actual road surface are provided on the road surface of the simulated tunnel so as to produce a light environment and a test environment for the tunnel middle section; a testing subsystem, comprising an uncolored target object, a spectroscopic radiation measurement device, a brightness measurement device, a dynamic eye movement measurement device and a distance measurement device for performing tests and collecting test data results; and a data processing subsystem, comprising a computer system for fitting and processing the test data.

The adjustable illumination device of the simulated tunnel middle section subsystem is a power-adjustable illumination light source provided at the top of the simulated tunnel; light absorbing materials arranged on the top surface, the left side surface and the right side surface of the simulated tunnel are black decorative materials; the obstruction object is a black curtain; the diffuse reflection materials provided on the road surface similar to an actual road surface are modified asphalt waterproofing membranes; in the testing subsystem, the uncolored target object is a gray cubic object with a reflectivity of 20%; the spectroscopic radiation measurement device is a spectroscopic radiation illuminometer; the brightness measurement device is a color luminance meter; and the dynamic eye movement measurement device is a dynamic eye tracker. The dynamic eye tracker has a data acquisition frequency of 30 Hz, i.e. the eye movement data is acquired every 20 ms; the eye movement capturing range is ±35° in the horizontal direction and ±27.5° in the vertical direction; eye movement tracking resolution is 0.1°; and accuracy of vision focus is 0.5°-1.0°. The information of the driver's visual recognition of the visual object can be dynamically recorded for determining the time required by the driver to visually capture the fixation point of the target object, and the side length of the cubic object is less than or equal to 20 cm.

The illumination device in the system of this embodiment is an illumination device with controllable color temperature, color rendering index and brightness, and is flexible and convenient in setting of the light environment. In the measurement of the light environmental parameter values, in order to perform convenient measurement, the color temperature measurement device and the color rendering index measurement device are the same, which is the spectroscopic radiation illuminometer. The brightness measurement device in the system can be a color luminance meter or an illuminometer. The brightness value can be obtained according to the relationship between illuminance and brightness. For example, the average brightness value and the average illumination value of a road are measured first, then the road average illuminance conversion coefficient can be calculated, and this coefficient can be used in the conversion ratio relationship between illumination and brightness, so that the brightness level can be obtained by determining the illuminance.

By means of the visual efficacy measuring method for objects in different light environments, a good guiding standard is provided for reasonably and efficiently setting the color temperature, color rendering index and brightness of an illumination device in consideration of the influence that the light environment settings for illumination of a night road or a tunnel middle section have on the visual efficacy of a driver.

The invention claimed is:

1. A visual efficacy measuring method for objects in different light environments, comprising the following steps:
   (a) setting light environmental parameters of an object environment, which comprise color temperature, color rendering index and brightness, selecting a set of color temperature, color rendering index and brightness as the light environmental parameters;
   (b) measuring color temperature values of the object environment in different time segments to obtain a relationship between color temperature and time, and calculating an average color temperature value as the actually measured color temperature on the basis of color temperature values in the different time segments;
   (c) determining the object environment in a night time segment to be a tunnel middle section according to time point values in said relationship between color temperature and time, based on human body circadian rhythm, and performing a visual recognition test in the tunnel middle section, the visual recognition test comprising steps of:
      (c1) placing a target object at a random target position in the tunnel middle section, wherein the target object has a surface reflection index of R and a side length of C;
      (c2) assigning a tested driver to be at a driver position having a distance of D from the target position in the tunnel middle section, with a visual height of H, getting the tested driver to put on an eye movement recording device and calibrating the eye movement recording device, blocking the tested driver's observation direction with a shelter;
      (c3) recording an eye movement video with the calibrated eye movement recording device, removing the shelter, and instructing the tested driver to search and visually recognize the target object;
      (c4) operating the eye movement recording device to stop recording the eye movement video, and archiving the visual recognition results and the eye movement video of the tested driver;
      (c5) changing the tested driver, and repeating the steps (c1) to (c4), thereby obtaining the visual recognition results and the eye movement video of multiple tested drivers;
   (d) resetting the light environmental parameters by using different color temperature, color rendering index and brightness for the tunnel middle section, and repeating the steps (b) and (c) to obtain the visual recognition results and the eye movement video of multiple tested drivers under multiple different sets of light environmental parameters;
   (e) analyzing the visual recognition results and the eye movement video of the multiple tested drivers collected by the eye movement recording device, determining the visual fixation frames of the multiple tested drivers visually recognizing the target object as well as the validity of the visual recognition results, calculating the visual recognition time for the multiple tested drivers to visually recognize the target object in different light environments according to the visual fixation frames, performing correlation analysis on the visual recognition information data to establish a relationship of the visual recognition time in relation with the actually measured color temperature, color rendering index and average brightness of the light environments, thereby obtaining data relationship curves of corresponding visual recognition time and color rendering index under different actually measured color temperatures with the same brightness;

(f) performing visual efficacy analysis by analyzing the relationship of the human body circadian rhythm and the visual recognition time in relation with the actually measured color temperature, color rendering index and brightness of the light environments, thereby obtaining a standard of light environmental parameters for improving visual efficacy of the target object with a combination of color temperature, color rendering index and brightness.

2. The visual efficacy measuring method for objects in different light environments in accordance with claim 1, characterized in that, the tunnel in the step (a) is a simulated tunnel;

the human body circadian rhythm in the step (c) comprises a weakened inhibition function towards melatonin secretion of human body at night, so that performing the visual recognition test steps at night can directly reveal the driving safety;

the target object in step (c) is a gray cube, with the safe stopping sight distance of $D_0$ at a tunnel maximum speed limit, if the side length of the target object is $C_0$ and the tested driver's visual height is a passenger car driver's standard sitting height $H_0$, then the distance D from the target object to the tested driver, the side length C of the target object and the tested driver's visual height H in relation with the safe stopping sight distance $D_0$, the standard side length $C_0$ of the target object and the standard visual height $H_0$ shall meet the conversion ratio relationship of $D:C:H=D_0:C_0:H_0$.

3. The visual efficacy measuring method for objects in different light environments in accordance with claim 1, characterized in that, the value ranges of the light environmental parameters are that the color temperature ranges from 3000K to 6500K, the color rendering index ranges from 50 to 100, and the brightness ranges from 1.0 $cd/m^2$ to 10 $cd/m^2$;

the distance D from the target object to the tested driver is equal to the safe stopping sight distance, the side length C of the target object is 20 cm, the visual height H is 1.2 m, the surface reflection index of the target object is 0.2.

4. The visual efficacy measuring method for objects in different light environments in accordance with claim 1, characterized in that, the color temperature has values of 3000K, 4000K, 5000K, 5700K, 6500K, the color rendering index has values of 60, 70, 80, 90, and the brightness has values of 1.5 $cd/m^2$, 2, 0 $cd/m^2$, 2.5 $cd/m^2$, 3.0 $cd/m^2$, 3.5 $cd/m^2$, 4.0 $cd/m^2$, 4.5 $cd/m^2$, 5 $cd/m^2$.

5. The visual efficacy measuring method for objects in different light environments in accordance with claim 1, characterized in that, the position of the target object in the tunnel middle section is set randomly; the driver's front scene is blocked with a black curtain, the target object is placed and then the black curtain is removed, meanwhile the tested driver is instructed to visually recognize the object, eye movement video recording is stopped after the visual recognition is finished, and then the tested driver is asked to give visual recognition results regarding the aspects that (1) if there is a target object; (2) the shape of the target object; and (3) the color of the target object, and by comparing the visual recognition results with the actual shape and color of the target object, determining a visual recognition result thereof to be an invalid result if the visual recognition result does not match the actual shape and color of the target object.

6. The visual efficacy measuring method for objects in different light environments in accordance with claim 1, characterized in that, the tested drivers are randomly selected persons at different age groups with different normal eyesight levels and different driving ages, and tests for each of the drivers are repeated in the same test environment to eliminate individual differences of the drivers.

7. The visual efficacy measuring method for objects in different light environments in accordance with claim 6, characterized in that, based on the data relationship curves of corresponding visual recognition time and color rendering index under different actually measured color temperatures with the same brightness, obtaining a conclusion that the visual efficacy of the target object is improved by reducing the color temperature under a constant brightness level and a constant color rendering index of the light environment.

8. The visual efficacy measuring method for objects in different light environments in accordance with claim 6, characterized in that, based on the data relationship curves of corresponding visual recognition time and color rendering index under different actually measured color temperatures with the same brightness, obtaining a conclusion that the visual efficacy of the target object is improved by setting the color temperature range of the tunnel middle section at night to be 3500K-3700K.

9. A color temperature standard determining method for a tunnel middle section in day time, comprising:

(a) setting light environmental parameters of an object environment, which comprise color temperature, color rendering index and brightness, selecting a set of color temperature, color rendering index and brightness as the light environmental parameters;

(b) measuring color temperature values in different time segments to obtain a relationship between color temperature and time, (c) selecting a stably distributed color temperature segment according to the relationship between color temperature and time, (d) determining color temperature to be a major factor that influences driving safety in day time environment according to a relationship of light source in relation with melatonin secretion inhibition of human body circadian rhythm, and based on analysis of how human eyes adapt to color temperature of light, setting the stably distributed color temperature segment to be the color temperature standard for the tunnel middle section in day time, wherein said object environment is natural light environment in day time.

10. The color temperature standard determining method for a tunnel middle section in day time in accordance with claim 9, characterized in that, the color temperature standard is 4500K-5000K.

* * * * *